United States Patent
McCarty et al.

(10) Patent No.: US 9,057,886 B2
(45) Date of Patent: *Jun. 16, 2015

(54) METHODS OF DESIGNING PROGRESSIVE ADDITION LENSES

(75) Inventors: Shawn McCarty, San Diego, CA (US); Jagdish M. Jethmalani, San Diego, CA (US)

(73) Assignee: FSSILOR INTERNATIONAL (COMPAGNIE GENERALE D'OPTIQUE), Charenton Le Pont (FR)

( * ) Notice: Subject to any disclaimer, the term of this patent is extended or adjusted under 35 U.S.C. 154(b) by 0 days.

This patent is subject to a terminal disclaimer.

(21) Appl. No.: 13/066,482

(22) Filed: Apr. 14, 2011

(65) Prior Publication Data

US 2012/0262668 A1    Oct. 18, 2012

(51) Int. Cl.
*G02C 7/02* (2006.01)
*G02C 7/06* (2006.01)

(52) U.S. Cl.
CPC ............... *G02C 7/027* (2013.01); *G02C 7/063* (2013.01); *G02C 2202/22* (2013.01)

(58) Field of Classification Search
CPC .......... G02C 7/04; G02C 7/041; G02C 7/042; G02C 7/043; G02C 7/044; G02C 7/045
USPC ............................ 351/159.73–159.77, 159.42
See application file for complete search history.

(56) References Cited

U.S. PATENT DOCUMENTS 5,270,745 A * 12/1993 Pedrono ................... 351/159.42
5,272,495 A * 12/1993 Pedrono ................... 351/159.42
6,712,466 B2   3/2004 Dreher
7,066,597 B2 * 6/2006 Miller et al. ............. 351/159.42
7,207,674 B2 * 4/2007 Bourdoncle et al. ..... 351/159.42
7,234,810 B2   6/2007 Warden et al.

(Continued)

FOREIGN PATENT DOCUMENTS

WO    WO-2009/135058         11/2009
WO    WO 2009135058 A2 *     11/2009

OTHER PUBLICATIONS

IOT Futura 2011 Catalog (2011).

*Primary Examiner* — Scott J Sugarman
*Assistant Examiner* — Robert E Tallman
(74) *Attorney, Agent, or Firm* — Cozen O'Connor

(57) ABSTRACT

Embodiments of the invention pertain to a method for producing a spectacle lens with optimal correction across the entire lens that take the patient's complete measured wavefront into account. Specific embodiments also consider one or more additional factors such as vertex distance, intermediate power, add power, segmental fitting height, pantoscopic tilt, and use conditions. The lens wavefront can be achieved by optimizing a corrected wavefront, where the corrected wavefront is the effect of the patient's measured wavefront and/or the lens wavefront. The optimization of the corrected wavefront can involve representing the measured wavefront and/or the lens wavefront on a grid. In an exemplary embodiment, the grid can lie in a plane. During the optimization, a subset of the grid can be used for the representation of the measured wavefront at a point on the grid so that the portions of the measured wavefront that contribute to the corrected wavefront at that point on the grid are taken into account. The progressive addition lens can be utilized for distance, intermediate and reading use wherein the power progression is non-linear in any number or all of the near, intermediate, and far zones.

15 Claims, 10 Drawing Sheets

(56) References Cited

U.S. PATENT DOCUMENTS

| | | |
|---|---|---|
| 7,371,804 B2 | 5/2008 | Jethmalani et al. |
| 7,806,526 B2 * | 10/2010 | Bourdoncle et al. ..... 351/159.42 |
| 7,832,863 B2 | 11/2010 | Dreher et al. |
| 2010/0060851 A1 * | 3/2010 | Allione ........................ 351/169 |
| 2010/0079722 A1 * | 4/2010 | Guilloux et al. .............. 351/169 |
| 2012/0105800 A1 * | 5/2012 | Allione et al. ........... 351/159.74 |

\* cited by examiner

Spatial Units in X-Y Plane

Spatial Units in X-Y Plane

Spatial Units in X-Y Plane

Spatial Units in X-Y Plane

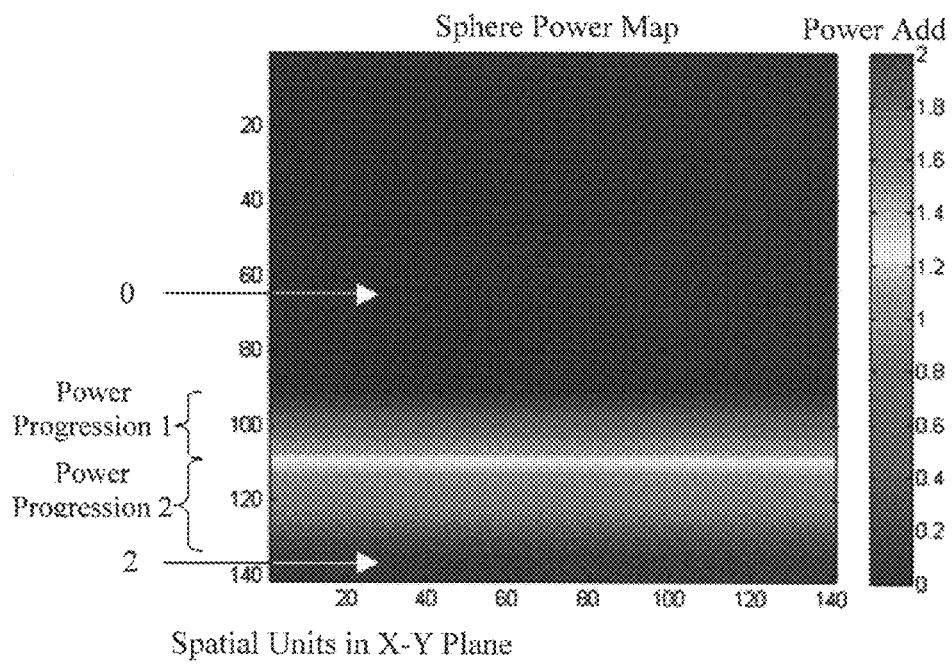
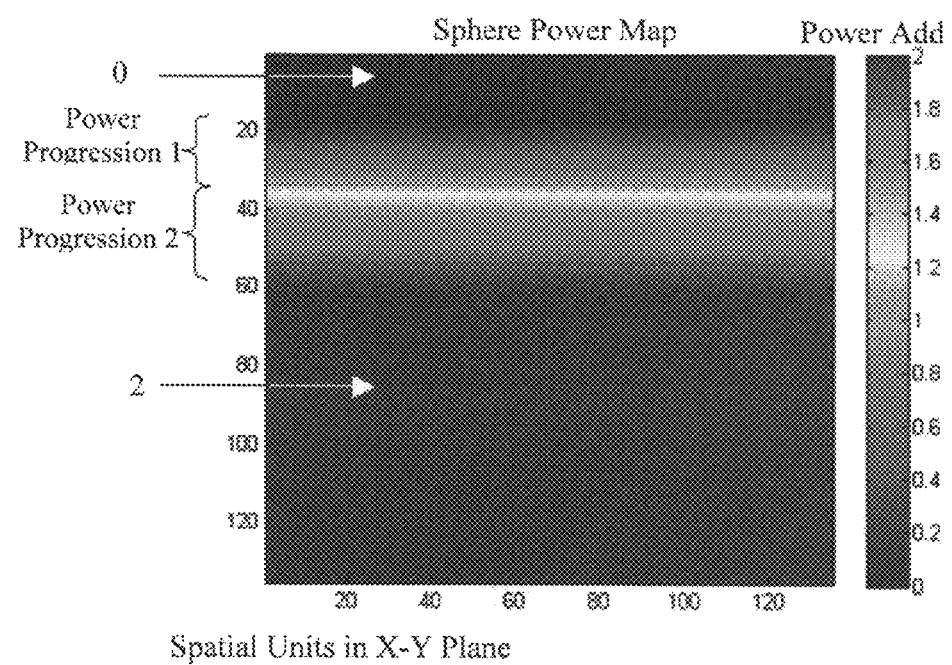

FIGURE 9

| Measured Add | | Recommended Add at Actual Computer Distance | | | | | | | | | | | |
|---|---|---|---|---|---|---|---|---|---|---|---|---|
| at 16" | at 24" | 30" | 29" | 28" | 27" | 26" | 25" | 24" | 23" | 22" | 21" | 20" |
| +0.75 | +0.25 | +0.25 | +0.50 | +0.50 | +0.50 | +0.50 | +0.50 | +0.50 | +0.50 | +0.50 | +0.50 | +0.50 |
| +1.00 | +0.50 | PAL/SV | PAL/SV | PAL/SV | PAL/SV | PAL/SV | +0.50 | +0.50 | +0.50 | +0.75 | +0.75 | +0.75 |
| +1.00 | +0.75 | +0.50 | +0.50 | +0.75 | +0.75 | +0.75 | +0.75 | +0.75 | +0.75 | SV | SV | SV |
| +1.25 | +0.50 | PAL/SV | PAL/SV | PAL/SV | PAL/SV | PAL/SV | +0.50 | +0.50 | +0.75 | +0.75 | +1.00 |
| +1.25 | +0.75 | PAL/SV | PAL/SV | +0.50 | +0.75 | +0.75 | +0.75 | +0.75 | +1.00 | +1.00 | +1.00 | +1.00 |
| +1.25 | +1.00 | +0.75 | +0.75 | +1.00 | +1.00 | +1.00 | +1.00 | +1.00 | SV | SV | SV | SV |
| +1.50 | +0.75 | PAL/SV | PAL/SV | PAL/SV | PAL/SV | +0.75 | +0.75 | +1.00 | +1.00 | +1.00 | +1.00 | +1.25 |
| +1.50 | +1.00 | +0.75 | +0.75 | +0.75 | +0.75 | +1.00 | +1.00 | +1.00 | +1.00 | +1.25 | +1.25 | SV |
| +1.75 | +1.00 | PAL/SV | PAL/SV | PAL/SV | PAL/SV | PAL/SV | +1.00 | +1.00 | +1.00 | +1.00 | +1.25 | +1.25 |
| +1.75 | +1.00 | PAL/SV | PAL/SV | PAL/SV | +0.75 | +0.75 | +1.00 | +1.00 | +1.00 | +1.25 | +1.25 | +1.50 |
| +1.75 | +1.25 | +1.00 | +1.00 | +1.00 | +1.00 | +1.25 | +1.25 | +1.25 | +1.25 | +1.50 | SV | SV |
| +2.00 | +1.00 | PAL/SV | PAL/SV | PAL/SV | PAL/SV | +1.00 | +1.00 | +1.25 | +1.25 | +1.50 | +1.50 |
| +2.00 | +1.50 | +1.25 | +1.25 | +1.25 | +1.25 | +1.50 | +1.50 | +1.50 | +1.50 | SV | SV | SV |
| +2.25 | +1.00 | PAL/SV | PAL/SV | PAL/SV | PAL/SV | PAL/SV | +1.25 | +1.50 | +1.50 | +1.50 | +1.75 | +1.75 |
| +2.25 | +1.25 | PAL/SV | PAL/SV | PAL/SV | PAL/SV | +1.00 | +1.25 | +1.25 | +1.50 | +1.50 | +1.75 | +1.75 |
| +2.25 | +1.75 | +1.50 | +1.50 | +1.50 | +1.75 | +1.75 | +1.75 | +1.75 | SV | SV | SV | SV |
| +2.50 | +1.50 | PAL/SV | PAL/SV | PAL/SV | +1.00 | +1.25 | +1.50 | +1.50 | +1.75 | +2.00 |
| +2.50 | +1.25 | PAL/SV | PAL/SV | PAL/SV | PAL/SV | +1.00 | +1.25 | +1.50 | +1.50 | +1.75 | +2.00 |
| +2.50 | +1.75 | +1.25 | +1.25 | +1.50 | +1.50 | +1.50 | +1.75 | +1.75 | +1.75 | +2.00 | SV | SV |
| +2.75 | +1.50 | PAL/SV | PAL/SV | PAL/SV | PAL/SV | PAL/SV | +1.25 | +1.50 | +1.75 | +1.75 | +2.00 |
| +2.75 | +1.75 | PAL/SV | +1.25 | +1.25 | +1.50 | +1.50 | +1.75 | +1.75 | +2.00 | +2.00 | +2.25 | SV |
| +2.75 | +2.00 | +1.50 | +1.50 | +1.50 | +1.75 | +2.00 | +2.00 | +2.00 | +2.00 | +2.25 |
| +3.00 | +1.25 | PAL/SV | PAL/SV | PAL/SV | PAL/SV | PAL/SV | PAL/SV | +1.25 | +1.50 | +1.75 | +2.00 | +2.25 |
| +3.00 | +1.75 | PAL/SV | PAL/SV | PAL/SV | +1.25 | +1.50 | +1.50 | +1.75 | +2.00 | +2.00 | +2.25 | +2.50 |
| +3.00 | +2.25 | +1.75 | +1.75 | +2.00 | +2.00 | +2.00 | +2.25 | +2.25 | +2.25 | SV | SV | SV |
| +3.25 | +1.75 | PAL/SV | PAL/SV | PAL/SV | PAL/SV | +1.50 | +1.50 | +1.75 | +2.00 | +2.25 | +2.25 | +2.50 |
| +3.25 | +2.00 | PAL/SV | PAL/SV | +1.50 | +1.75 | +1.75 | +2.00 | +2.25 | +2.50 | +2.50 |
| +3.25 | +2.25 | +1.50 | +1.75 | +1.75 | +2.00 | +2.00 | +2.25 | +2.25 | +2.50 | +2.50 | SV | SV |
| +3.50 | +1.50 | PAL/SV | PAL/SV | PAL/SV | PAL/SV | PAL/SV | PAL/SV | +1.50 | +1.75 | +2.00 | +2.25 | +2.50 |
| +3.50 | +2.00 | PAL/SV | PAL/SV | PAL/SV | +1.50 | +1.75 | +1.75 | +2.00 | +2.25 | +2.50 | +2.50 | +2.75 |
| +3.50 | +2.25 | PAL/SV | +1.50 | +1.75 | +1.75 | +2.00 | +2.00 | +2.25 | +2.50 | +2.50 | +2.75 |
| +3.50 | +2.50 | +1.75 | +2.00 | +2.00 | +2.25 | +2.25 | +2.50 | +2.50 | +2.75 | +2.75 | SV | SV |

METHODS OF DESIGNING PROGRESSIVE ADDITION LENSES

BACKGROUND

Ocular lenses are worn by many people to correct vision problems. Vision problems are caused by aberrations of the light rays entering the eyes. These include low order aberrations—such as myopia, hyperopia, and presbyopia and higher order aberrations—such as spherical aberration, coma, trefoil, and chromatic aberrations. Additionally, aberrations are introduced by the sphere, cylinder, and axis corrections for myopia, hyperopia, and presbyopia, respectively. The aforementioned aberrations significantly degrade the quality of the images on an image plane. Thus, removing introduced and natural aberrations increases visual acuity.

Typically in the prior art, ocular lenses are made by generating prescriptions in lens blanks. This is accomplished by altering the topography of the surface of the lens blank.

Recently, attention has been given to methods for generating prescriptions to correct low order aberrations in lens blanks using a patient's measured wavefront information. Currently, several techniques are utilized to determine the optimum low order refraction from measured high order aberrations, including: the Gaussian Least Squares Fit, point spread optimization, and neural network analysis. Some of these techniques may be employed to derive the best low order prescription based at least in part from measured high order aberration values and to "fit" an optimum wavefront across an entire spectacle lens based on the patient's measured wavefront.

Using one or more of these fitting techniques may yield a better refraction than conventional subjective refractions in the intermediate zone. Additionally, in many applications, consideration should be given to off-axis gaze angles. In particular, one disadvantage to traditional lens manufacturing is that many people experience distortion when looking off-center outside the central region, commonly called "swim."

For example, distortion can be present in progressive addition lenses (PAL) that possess both far and near correction zones where the power change between the two zones is progressive. Due to the progressive power change, which is mostly due to changes in the front or back radius of curvature, there can be distortion around the near zone of the lens (swim). The progressive power change can create a channel of varying optical power and two swim zones adjacent to this channel. The power change in the channel can possess smooth transition and, in most instances, may not have any distortion. The swim zones can possess distortion due to off-axis astigmatism and other aberrations. The progressive design can be generated on the front side, which is typically cast molded, the back side, or on both sides. Additionally, PALs can be used by presbyopic patients to focus on objects that are far from the patient and on objects that are nearby without an abrupt change in power.

To solve distortion problems in PALs, the prior art methods determined a wavefront for a patient's spectacle lens based on the patient's measured wavefront to reduce distortion when the patient looks off-center outside a central zone of the spectacle. This is accomplished with a progressive addition surface (contour map) based on wavefront optimization and weighting functions that are independent of the lens blank base curves. The progressive addition surfaces may comprise a far zone, a near zone, an intermediate zone, and limiters for off-axis astigmatism.

Typically, the contour maps of the prior art have noticeable swim regions in spectacle lenses for some patients. Applying these contour maps on a lens leads to compromising the patient's visual acuity in one or more of the three power progression zones, i.e., far, near or intermediate. Thus, a method and apparatus are needed to provide customized progressive addition lenses (PALs) that lower perceptible distortions without significantly compromising visual acuity.

PAL designs for computer use typically include a very narrow far zone limited to 10-20 feet, a wide fixed intermediate zone to view the entire computer screen, and a fixed reading zone. Additionally, PALs for computer use are typically designed for a computer working distance of approximately 24 inches. In the prior art, the intermediate power is typically set to 50-60% of the reading power, representing the change in accommodation from 16" to 24". However, the change in accommodation from 16" to 24" varies from patient to patient. Additionally, the computer working distance for each individual changes due to variances in computer screen size and specific user preference. Thus, the prior art PALs do not function optimally.

Methods and apparatuses are needed to increase the visual acuity for specific users at their respective specific working distances.

BRIEF SUMMARY

Embodiments of the present invention provide methods for determining a wavefront for a lens from a patient's measured wavefront wherein the power progression is non-linear. The wavefront can be used for producing a spectacle lens with optimal correction across the entire lens, taking into account the patient's complete measured wavefront. Specific embodiments can also take into account one or more additional factors such as vertex distance, segmental fitting height, pantoscopic tilt, frame dimensions to fit the optimized design within the frame, subjective refraction at different distances, and use conditions.

The lens wavefront can be achieved by optimizing a corrected wavefront, where the corrected wavefront is the combined effect of the patient's measured wavefront and/or the patient's lens wavefront. In an exemplary embodiment of the present invention, the optimization of the corrected wavefront involves representing the measured wavefront and/or the lens wavefront on a grid. In a further exemplary embodiment, the grid lies in a plane. During the optimization of the corrected wavefront, a subset of the grid can be used for the representation of the measured wavefront at a point on the grid so as to take into account the portions of the measured wavefront that contribute to the corrected wavefront at that point on the grid.

Another exemplary embodiment involves designing a contour map that is specific to the add power and the progression of power from the far zone to the near zone. The development of the progressive addition surface involves determining a target sphere power map wherein the power progression is non-linear, determining a target cylinder power map, and applying weighting factors for each of these maps. A final prescription in the form of a progressive addition lens design may comprise: a far zone surface comprising a low order prescription that includes sphere, cylinder and axis components and a progressive addition surface that includes the intermediate and near add power desired by the patient. The low order sphere, cylinder, and axis components of the final prescription are determined by a wavefront aberrometer. The intermediate and near add powers of the final prescription are determined with a phoropter. In a further exemplary embodiment, the progressive addition and low order lens surfaces are optimized to create a customized progressive addition lens best suited for the patient's selected frames. In other exemplary embodiments, the progressive addition lens design uses wavefront optimization based on wavefront refraction and compensation for patient specific and/or lens specific wavefront aberrations.

Another exemplary embodiment involves designing a contour map that is specific to the add power at the far zone, the intermediate zone, and the near zone wherein the power progression is non-linear. The add powers for optimal vision at the three zones vary from person to person. In this embodiment, the patient's refraction is measured at all zone distances and a design providing a power match at each zone is provided.

In yet another exemplary embodiment, a patient's distance vision prescription is first measured using a wavefront based aberrometer and thereafter intermediate and near add prescriptions are measured using either a wavefront based aberrometer, a phoropter, trial lenses, or by any other means that provides the intermediate and near add prescription specific to the patient. In some exemplary embodiments, the intermediate power is adjusted for a PAL design with an intermediate and a near prescription. To adjust the intermediate power, a specific distance measurement between the spectacle lenses and a target (e.g. a computer monitor) is obtained. The distance measurement, the intermediate, and the near add prescriptions can then be inputted into a database, such as a look-up chart, that provides a customized patient specific intermediate and near modified prescription.

BRIEF DESCRIPTION OF THE FIGURES

The patent or application file contains at least one drawing executed in color. Copies of this patent or patent application publication with color drawing(s) will be provided by the Office upon request and payment of the necessary fee.

FIG. 7A illustrates an exemplary non-linear power progression that is located in a lower region of the sphere map in accordance with one embodiment of the invention.

FIG. 7B illustrates an exemplary non-linear power progression that is located in an upper region of the sphere map in accordance with one embodiment of the invention.

FIG. 9 illustrates an exemplary intermediate power adjustment chart for determining customized patient specific intermediate and near add prescriptions in accordance with one embodiment of the invention.

DESCRIPTION OF EXEMPLARY EMBODIMENTS

Figure 1:
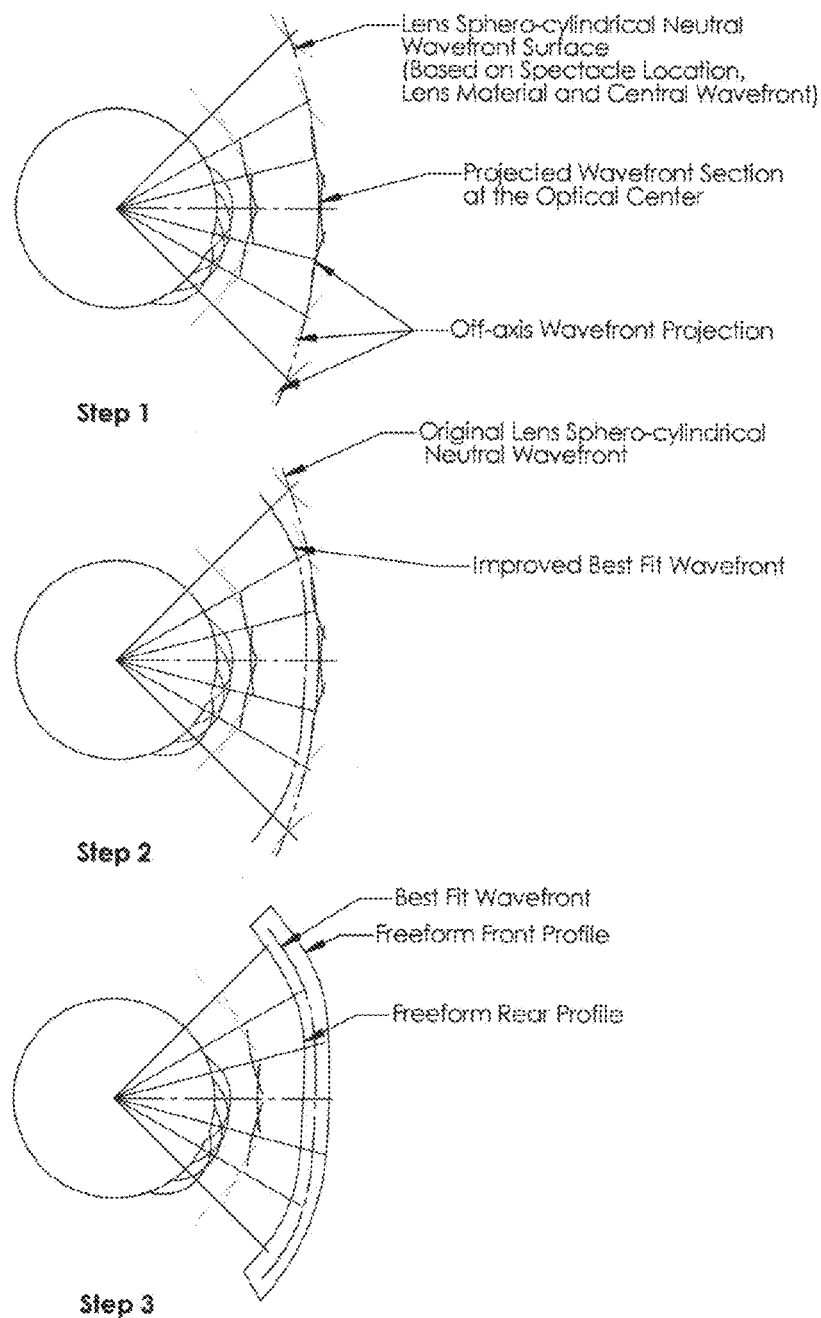
FIG. 1 illustrates exemplary steps for a method that produces a spectacle lens in accordance with an embodiment of the invention.

Exemplary embodiments of the invention provide methods for determining a wavefront for a lens from a patient's complete measured wavefront. The measured wavefront can be used to produce a spectacle lens with an optimal correction across the entire lens. Exemplary embodiments may also take into account one or more additional factors such as vertex distance, segmental fitting height, pantoscopic tilt, frame dimensions to fit the optimized design within the frame, and use conditions.

An exemplary lens wavefront may be obtained by optimizing a corrected wavefront, where the corrected wavefront is the combined effect of the patient's measured wavefront and the lens wavefront. The optimization of the corrected wavefront can involve representing the measured wavefront and the lens wavefront on a grid. In an exemplary embodiment, the grid can lie in a plane. During the "wavefront fitting optimization," a subset of the grid can be used to represent the measured wavefront at a point on the grid. The subset of the grid takes the portions of the measured wavefront that contribute to the corrected wavefront at the particular point on the grid into account.

An exemplary embodiment of the invention utilizes the hill climbing optimization technique used in the Gaussian Least Squares Fit and point spread optimization software to fit an optimal wavefront across a specified surface that is larger than that of the measured wavefront. The desired wavefront is projected from a number of points emanating in multiple directions from a nominal axis of rotation representing the center of the eye. The wavefront pattern used can be based solely upon the low order, or can also include some or all of the high order as well.

Each position of the wavefront as projected from the center of the eye can be convolved with a weighting function across the lens to enhance or emphasize the wavefront in certain areas while allowing other areas to be de-emphasized. The wavefront is best fit along a surface representing a paraxial lens representing the neutral axis of a lens. This paraxial lens is fixed in space at a specified central vertex distance and follows the basic lens design curvature of the chosen blank lens. The basic lens design curvature may be derived from the central low order prescription or may be used in conjunction with the high order and other factors such as vertex distance.

The progressive addition surface prescription may be aspheric and/or atoric possessing a progressive addition surface that can be applied to spherical or aspheric lens blanks. The optical lens blank material's refractive index can range from 1.4 to 1.8. Examples of optical lens blanks include CR-39 (refractive index of 1.499), Trivex (refractive index of 1.53), Polycarbonate (refractive index of 1.59), 1.6 index material (made of Mitsui monomers MR-8, MR-20), 1.67 index material (made of Mitsui monomers MR-7), 1.71 index material, 1.74 index material, 1.76 index material and any other composite material. The progressive addition lenses can be made with single lens blank or multilayered lens assemblies. The progressive addition lens can be made with clear, tinted, photochromic, or polarized lens blanks or assemblies.

The tint, photochromic dye or polarizing film is either on the surface of the lens blank, contained within a multilayered lens assembly, or contained within a lens coating. The progressive addition surface can be applied using freeform processing (generation and polishing) or any other mode of grinding and polishing to the front surface of single lens blank or multilayered lens assembly. Alternatively, the progressive addition surface can be applied to a back surface of single lens blank or multilayered lens assembly or to at least one of the inside surfaces of a multilayered lens assembly. The progressive addition surface can also be applied to a changeable refractive index layer within the lens blank (uniform or non-uniform in thickness) or to combinations of front and back surfaces of single lens blank or multilayered lens assembly. In a case of applying the progressive addition surface to at least one of the inside surfaces of a multilayered lens assembly, the first lens blank, the middle changeable refractive index layer and the second lens blank possess different refractive indices. To illustrate by way of example, the first lens blank can be made of refractive index 1.67 or 1.71, the middle layer of changeable index material can possess refractive index ranging from 1.57-1.60, and the second lens blank can be made of refractive index 1.50 or 1.53. The freeform generated progressive addition surface present on one of the inner layers leads to the middle layer of changeable index material possessing non-uniform thickness. This may lead to a wide far, a wide near and an intermediate zone and an overall design with reduced off-axis astigmatism and magnification.

Figure 2:
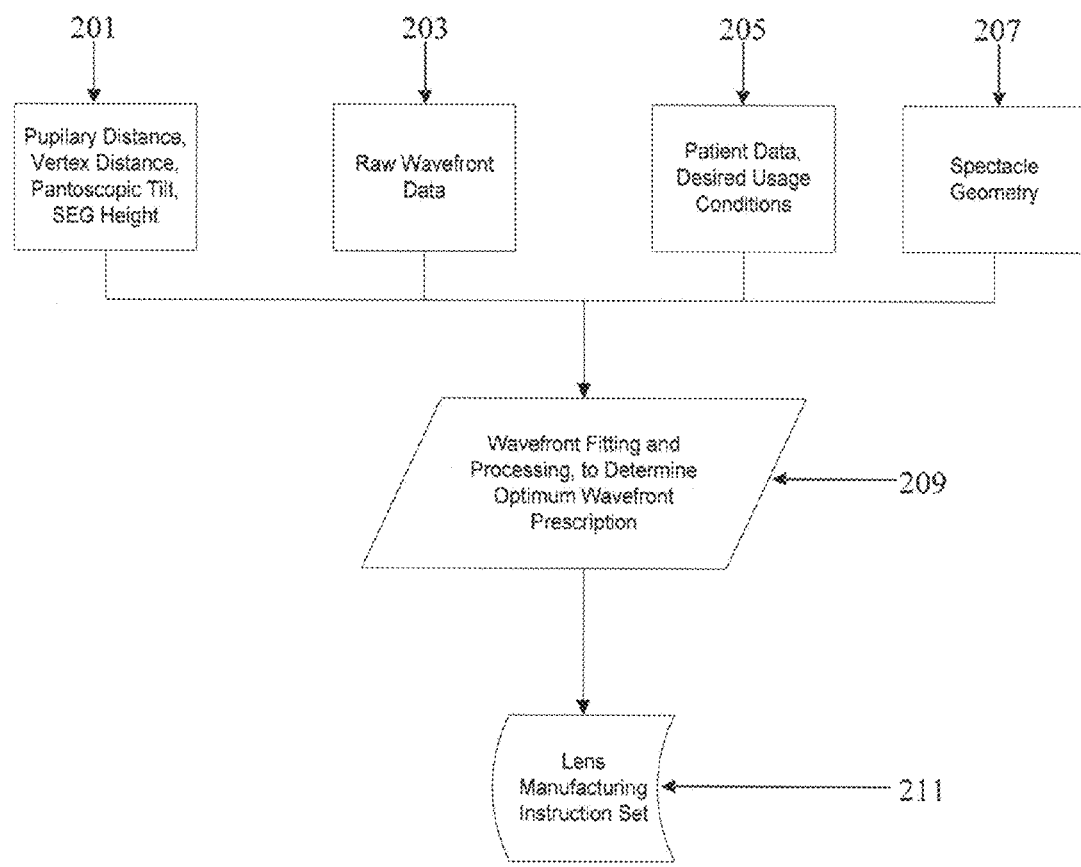
FIG. 2 illustrates an exemplary flow chart in accordance with an embodiment of the invention.

The final wavefront can be fitted with one or more of the following inputs:
Wavefront
Pupilary Distance
Vertex Distance
Pantoscopic Tilt
Segmental Fitting Height
Pupil Diameter
Conditions under which the lens will be used (day, office, night, etc)
Age
OD Subjective refraction
ADD Value
Spectacle Geometry
Refractive Index of the Lens Material FIG. 1 illustrates the steps of an exemplary embodiment of a method for producing a spectacle lens and FIG. 2 illustrates a flowchart of an exemplary embodiment indicating the flow of information of a wavefront optimization method. In an exemplary embodiment, pupillary distance, vertex distance, pantoscopic tilt, and SEG height (segmental fitting height) 201 can be combined with raw wavefront data 203, patient data and desired usage conditions 205, and spectacle geometry 207 in a wavefront fitting and processing algorithm to determine optimum wavefront prescription 209 to generate a lens manufacturing instruction set 211. In another exemplary embodiment, vertex distance 201 and its effect on the lens power and astigmatism can be compensated for in the wavefront fitting process 209. The output of the wavefront fitting software process (steps 1 & 2 in FIG. 1) is a set of instructions that facilitates production of a custom lens. Software (e.g., PALgo) may be used for a wavefront fitting process. MatLab software may be utilized to optimize the weighting of the target sphere and cylinder maps. An algorithm for PALgo software is described in U.S. patent application Ser. No. 11/963,609 titled "CUSTOMIZED Z-LENS DESIGN PROGRAM," the content of which is hereby incorporated herein by reference in its entirety. The "progressive addition surface" or "contour map" corresponds to the output of the wavefront fitting optimization. The "progressive addition lens design" corresponds to the optimized combination of the progressive addition surface and the patient specific refraction.

Various techniques may be utilized to generate the actual lens. For example, the generation instructions 211 may include a surface map for front and/or back surfaces of a lens, or a points file that can be fed into a freeform lens generator to cut custom front and/or custom back surfaces. Other approaches may utilize a changeable refractive index layer within the lens blank (or sandwiched multilayered lens assembly with thin wafer and thick base lens) that can be customized with the information from the fitting software. The sandwiched multilayered lens assembly is made of two lens blanks or lenses with a layer of changeable refractive index sandwiched in between the two lens blanks or lenses. The changeable refractive index layer changes its refractive index when it is exposed to electromagnetic radiation. The sandwiched multilayered lens assembly with a changeable refractive index layer is described in U.S. Pat. No. 6,712,466 titled "EYEGLASS MANUFACTURING METHOD USING VARIABLE INDEX LAYER," the content of which is hereby incorporated herein by reference in its entirety. In yet another exemplary embodiment, an inkjet deposition of different refractive indices across a lens surface is used to generate a corrected wavefront based on the fitting software output. In yet another exemplary embodiment, stereolithography may be used in conjunction with casting. Additionally, a combination of any of the above techniques can be combined to manufacture custom lenses.

Step 3 in FIG. 1 represents a freeform grinding approach to lens manufacturing. Casting, inkjet, and sandwiched changeable refractive index approaches as known in the art can also be utilized. The sandwiched multilayered lens assembly is described in U.S. Pat. No. 6,712,466 titled "EYEGLASS MANUFACTURING METHOD USING VARIABLE INDEX LAYER." U.S. Pat. No. 7,234,810 titled "SYSTEM FOR MANUFACTURING AN OPTICAL LENS," and U.S. Pat. No. 7,371,804 titled "MONOMERS AND POLYMERS FOR OPTICAL ELEMENTS," the content of each of which is hereby incorporated herein by reference in their entirety.

In an exemplary embodiment utilizing the freeform grinding approach, the final step in the wavefront fitting software can generate the shape of the front and back surface of the lens to achieve the given wavefront. Development of the shape of the front and back surface can also take into account the distortions from the lens thickness variations to minimize them. The output of the fitted wavefront software can, in an exemplary embodiment, be a points file. The points file can subsequently be transferred into a freeform lens generator for manufacturing the lens. The resulting lens can be optimized and customized for each patient based on all the input parameters. This freeform grinding technique can be utilized in conjunction with the refractive index changing material to further tune or enhance the refractive properties after lens grinding and polishing.

In an exemplary embodiment, a grid of shifts (rather than rotations) for measured and target pupil wavefronts is used and represented mathematically with images. The target wavefront can be used as the lens wavefront. From the measured wavefront, the target wavefront can be determined via one or more embodiments of the invention. A variety of configurations can be used to implement the target wavefront via an eyeglass for the patient.

As an example, a single lens with two surfaces can be used to create an eyeglass for a patient where one or both of the lens surfaces can be controlled to modify the wavefront of the lens.

Alternatively, two lens blanks each having two surfaces can be used with a variable index polymeric material in between them where one or more of the four lens blank surfaces and/or the polymeric material can be controlled to affect the wavefront of the lens. The lens surface(s) and/or variable cured index of the polymeric material are described in a two-dimensional plane corresponding to the height of the surface(s) or the projection of the index layer(s) onto a plane.

Figure 3:
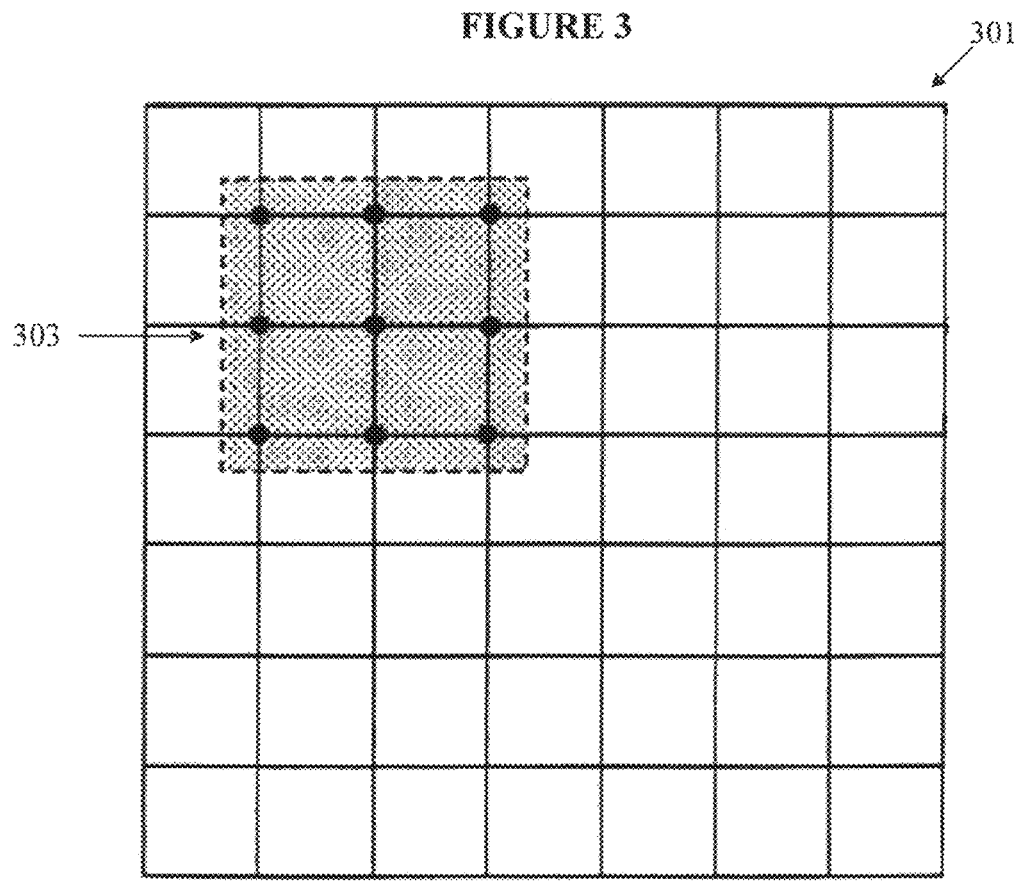
FIG. 3 illustrates an exemplary top view of spectacle and pupil samples as images at a particular shift (gaze) in accordance with one embodiment of the invention.

Aberrations are measured as components in an orthogonal expansion of the pupil sampled on the same grid spacing. In an exemplary embodiment, the grid spacing is about 0.5 mm and in another exemplary embodiment the grid spacing is about 0.1 mm. In an exemplary embodiment using Zernike polynomials, the components can be made orthogonal for the chosen pupil size due to discrete sampling. As an example, the components can be made orthogonal through a process such as Gram-Schmidt orthogonalization. Orthogonal components of aberrations for pupils centered at a specific point on the spectacle may then be computed by sample-by-sample multiplication (inner product) of the aberration component image with the lens (height or projection) image centered at the point of interest, as in FIG. 3. FIG. 3 illustrates a top view of exemplary spectacle and pupil samples as images at particular shift (gaze) on a grid 301, which can be used for computation of aberrations for pupils having a diameter of 3 samples 303, centered at a chosen coordinate on a spectacle grid 301 having a diameter of 8 samples.

Zernike polynomials are orthogonal and when samples are taken, approximations of Zernike polynomials can be created. In an exemplary embodiment, the approximations of Zernike polynomials can then be modified to make orthogonal polynomials, so as to create new polynomials.

In an exemplary embodiment, points on the pupil outside the pupil diameter are assumed to be zero. Non-squared pupil shapes may be formed by zeroing select points within the square of the pupil diameter 303. Mathematically, the process of computing the inner product centered at all possible locations on the grid is a cross correlation, which may be implemented with a fast convolution algorithm. An image can be produced for each Zernike via the cross-correlation. The image for each Zernike can be used to create a target and an error. The error can be used to produce an error discrimination or a weighted sum of all pixels in the image square.

In an exemplary embodiment, a grid size and spacing is chosen to represent the lens and pupil in a plane. An example of such a grid 301 is shown in FIG. 3. The aberrations of interest are orthogonalized on the grid at the chosen pupil size. Thereafter, a given aberration centered at every point may be estimated by cross-correlation of the orthogonalized Zernike image and the spectacle image. This cross-correlation results in an image for each Zernike component. An error image for each point on the lens may be estimated as a difference between the computed and desired Zernike aberration centered at each point in the image.

The desired correction is, to a first approximation, assumed to be constant in this plane with a shift corresponding to a given gaze angle. The rotation is otherwise neglected as shown in FIG. 2. For large gaze angles, the effect of rotation can be compensated by providing a spatially-varying correction target. The spatially-varying target can be approximated by rotating the paraxial target.

Simple convolution may be replaced with a more exact geometric calculation of the ray-surface intersection corresponding to a ray-tracing-style algorithm over a fixed grid. Other grid geometries may be used (e.g., hexagonal instead of rectangular). The result is essentially a spatially varying sample spacing and convolution, increasing computation time.

Other metrics of surface error may be computed from the Zernike component error images, as done with single pupil representations. For example, images of sphere/cylinder/values (or errors from desired) may be computed by applying the usual conversion on a pixel-by-pixel basis.

The total root-mean-square (rms) may be represented by either the sum of all component terms squared for a particular pupil location or the sum of all pixels squared (and properly normalized) within the pupil. This may be achieved by cross-correlations of a pupil-sized aperture of ones with an image of the lens values squared. The total high order may be computed by subtracting the low order aberration images from the total rms image. High order error may also be computed by subtracting the target high order images, squared pixel-by-pixel. Certain error optimizations may be mathematically equivalent to known regularization algorithms.

A total error discriminant may be generated by summing the desired error images over the entire lens. A pixel-by-pixel weighting may be incorporated to selectively weight the error at various regions in the lens. This may be done independently for each Zernike component. Standard optimization procedures (e.g., convex programming) may be used to produce a lens image that minimizes the error discriminant. If the lens image is sufficiently small, the cross-correlation may be represented as a matrix multiplication further simplifying the application of optimization algorithms known in the art. For larger image sizes, matrix multiplication may be impractical but may still be used to adapt the algorithm to the problem before implementing with fast convolution algorithms.

Constraints on the error may also be used in the optimization that would be represented by constraint images of max and/or min Zernike components or functions thereof. As an example of a constraint that can be utilized, certain Zernike components cannot be above a certain threshold for a certain area.

Free-floating points, such as boundaries, may be handled by setting their weights at or close to zero. This weighting allows the optimized region to be smaller than the actual grid, the optimized region to have an arbitrary shape, and/or the optimized region to only be optimized for points that will ultimately be used. In an exemplary embodiment, the patient-selected frame outline may be input as the region of optimization. As there can be an infinite number of solutions, an attempt can be made to optimize a certain shape inside of the lenses, such as the spectacle shape. Additionally, for example, a zero weight outside the spectacle frame may be used to optimize the lens for the spectacle frame.

Fixed points are given prior to optimization and may remain unchanged. The fixed points may be left unchanged by not applying a correction to them in the optimization algorithm while still using them to compute a correction. This concept can be used for boundaries as well, so as to only optimize for certain portions of lenses.

Grid(s) of constraints may be converted into a weighting and/or target (for unconstrained optimization) via a separate optimization procedure.

Multiple surfaces may be optimized simultaneously. As an example, two grids can be optimized simultaneously or each grid point can have two associated numbers to be optimized.

The patient's prescription (including high order) may be used as a target including deterministic variations with gaze if available. The patient's actual add requirements for different zones (i.e., working distances) may be used as a target as well.

Progressive addition lenses have low-order corrections in a pair of zones with some varying power along the line connecting them. In one exemplary embodiment, the rest of the lens is then optimized to reduce distortion. Further, the lens can be optimized to similarly reduce distortion. For example, the lens can be optimized to reduce distortion via power matching, matching second order wavefronts only, or full-wavefront matching with a varying tilt. Additionally, the wavefront fitting optimization limits astigmatism in the lens, which in turn limits the horizontal and vertical magnification. Methods for designing PALs wherein the designs comprise a linear power progression are described in PCT application No. PCT/US2009/042399 titled "METHOD OF DESIGNING PROGRESSIVE ADDITION LENSES," the content of which is hereby incorporated herein by reference in its entirety.

In accordance with an exemplary embodiment, a method of designing an optimized PAL with variable intermediate power comprises evaluating the following factors in order to produce an optimized PAL for a desired result:
 (a) a target sphere map with a non-linear power progression region,
 (b) a target cylinder map,
 (c) a sphere weighting map, and
 (d) a cylinder weighting map This exemplary embodiment provides PALs for patients for whom the dioptric power at the center of the progression is not necessarily the mean of the power at the two ends of the power progression. When the target sphere map's power progression is non-linear, there may be at least one distinct point where the two power progression segments merge and the slopes for each segment change. There may be one or more distinct points and the slope of each segment may further be linear or non-linear. In the exemplary embodiments of the invention, the non-linear power progression can be placed at any location of the contour map.

In accordance with an exemplary embodiment of the invention, there are multiple distinct points in the power progression where the slope of each segment is linear. In yet another exemplary embodiment, there may or may not be a distinct point in the power progression where the slope of each segment is non-linear. In an exemplary embodiment with no distinct points, the power progression is smooth but non-linear. In some other exemplary embodiments, the distinct point(s) in the power progression are located at the mid-point of the power progression or may be distributed across the entire power progression. In another exemplary embodiment, the power progression comprises two or more linear progressions, which in the aggregate, form a non-linear power progression. The distinct point(s) could be located anywhere from 1% to 99% of the power progression.

Figure 4A:
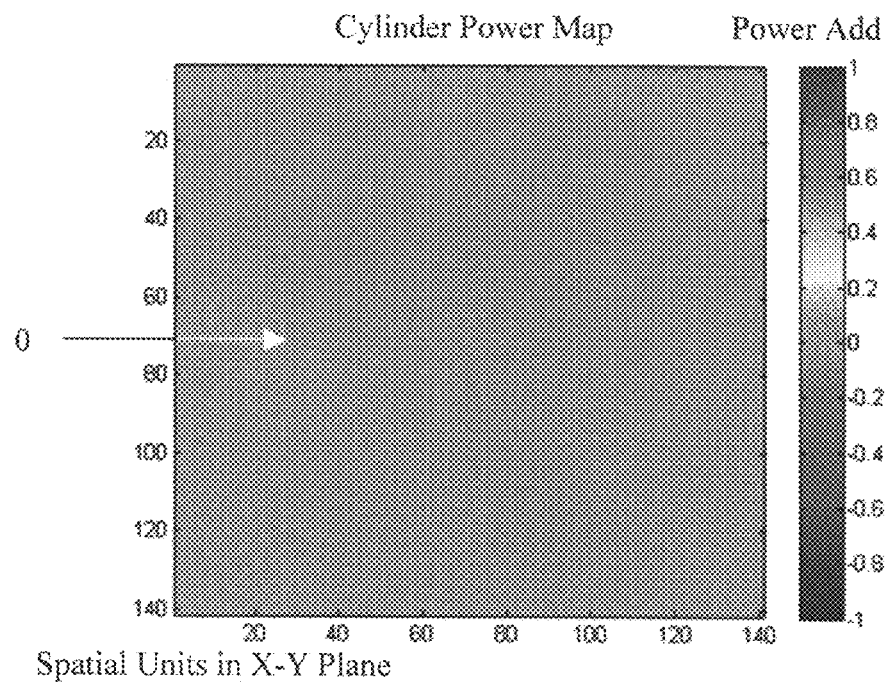
FIGS. 4A-4D illustrate exemplary input maps for Indoor PAL designs such as a target cylinder map, a target sphere non-linear map, a cylinder weight map, and a sphere weight map in accordance with one embodiment of the invention.
Figure 4B:
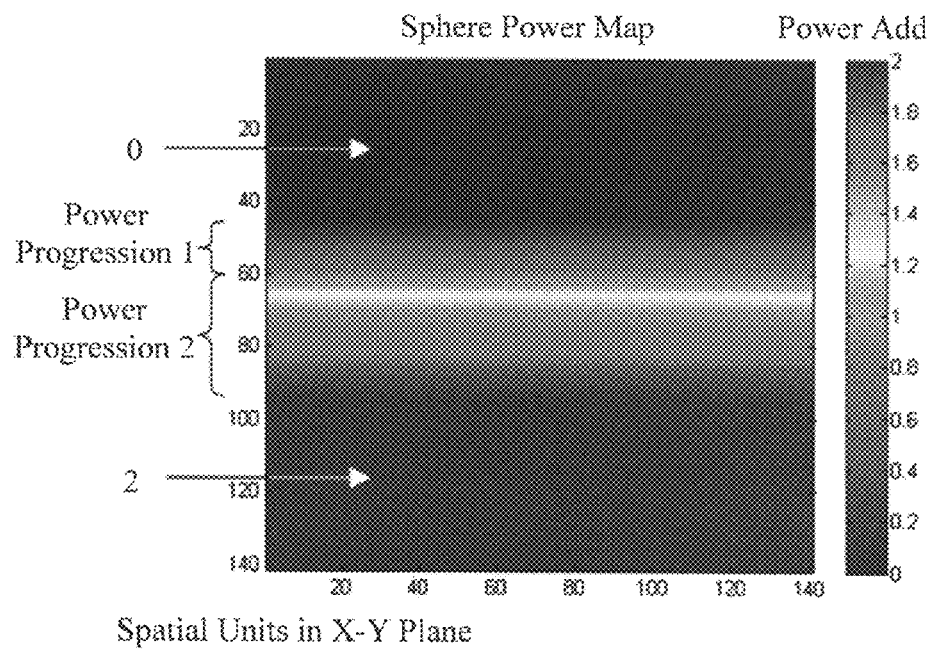
Figure 4C:
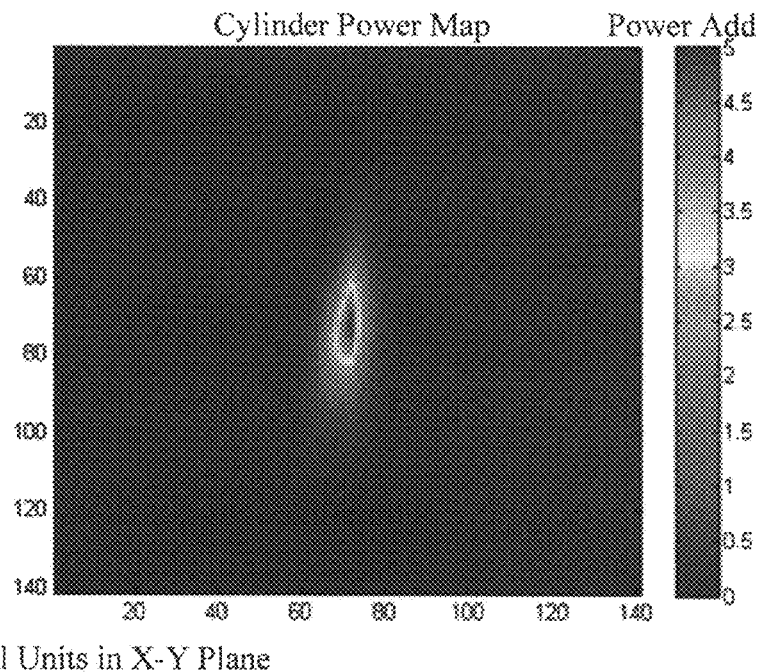
Figure 4D:
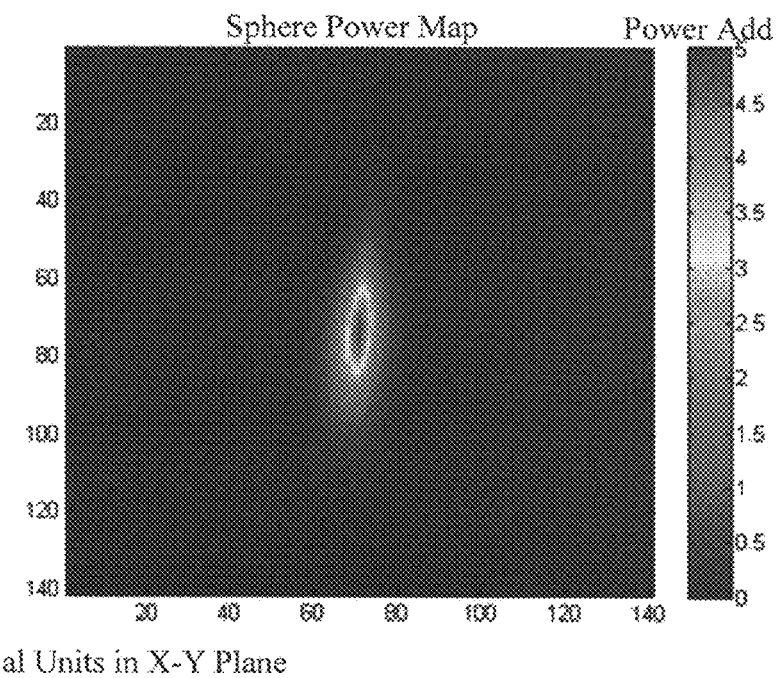

FIGS. 4A-4D illustrate exemplary embodiments wherein the power progression is non-linear. FIG. 4A is a target cylinder map where the power of the entire map is set to zero units of power. FIG. 4B illustrates a target sphere map where the power progression is non-linear. The power progression rises sharply from 0D power at 50 units to 1D power at 60 units. The add power rises slowly from 1D power at 60 units to 2D power at 90 units. Thereafter, the add power remains at 2D. FIGS. 4C and 4D illustrate exemplary cylinder and sphere weight maps in accordance with an exemplary embodiment where the weighting in the center of the map is set to 4.5 units of weight and the other region is set to 0 units of weight. The outputs of FIGS. 4A-D are illustrated in FIGS. 5A-B.

As an exemplary advantage to specific weighting parameters, a high weight can be assigned to the geometrical center of the weighting map. Thereafter, the weighting map can be raised to the $n^{th}$ power to further emphasize the weighting at the center of the map. In this exemplary embodiment, cylinder and sphere errors at the geometrical center of the lens are minimized.

Figure 5A:
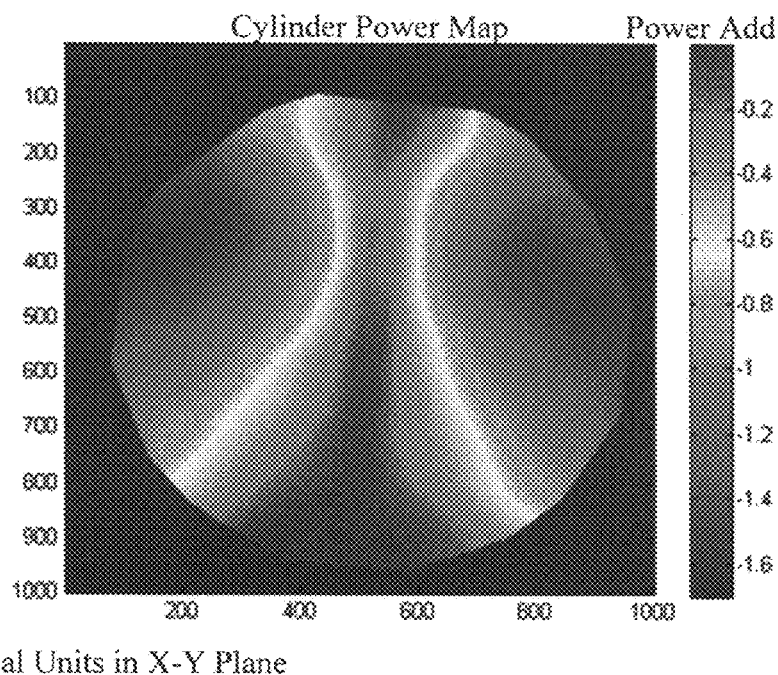
FIGS. 5A-5B illustrate exemplary respective astigmatism and sphere maps in accordance with one embodiment of the invention.
Figure 5B:
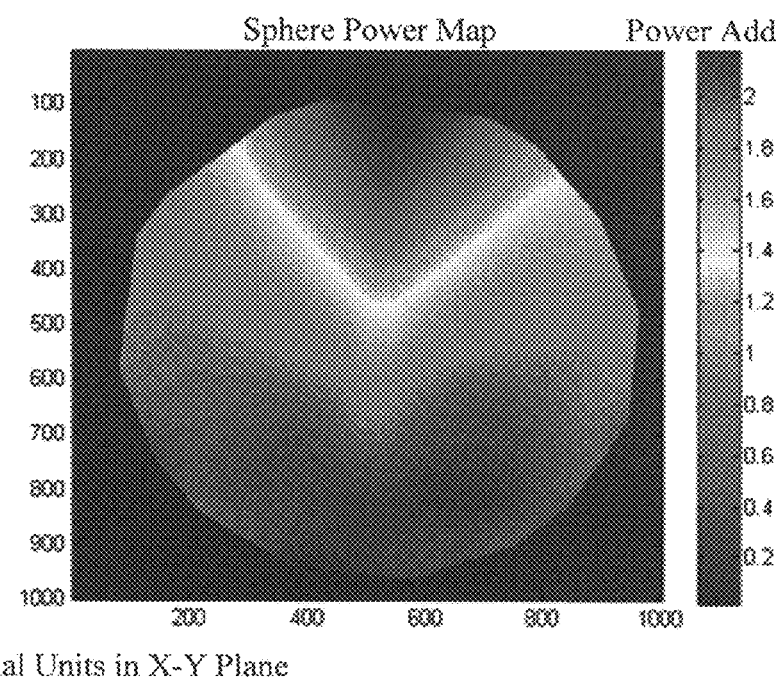

FIGS. 5A-B show the astigmatic and sphere maps for a customized progressive design for a plano lens with +1.5D add power at the geometrical center of the power progression and +2D add power at the bottom of the power progression in accordance with an exemplary embodiment of the invention.

FIG. 5A is a representation of the cylinder power map with a central band that starts with a far zone and ends in a reading zone that possesses 0D of power. The off-axis astigmatism adjacent to the power progression possesses −1.2D of power while the boundary region between the off-axis astigmatism and the far zone possesses −0.4D to −0.6D of power. The wavefront fitting optimization limits off-axis astigmatism in the lens to −1.6D, which in turn limits the horizontal and vertical magnification.

FIG. 5B is a representation of the sphere non-linear power map where the far zone possesses 0D to 0.4D of power, the intermediate zone possesses 0.5D to 1.7D of power, and the reading zone possesses 1.8D to 2.0D of power. The corridor length for this design can be varied to fit within the frame with a minimum segmental height of 16 to 22 mm. The progression of add power may range from +0.50D to +4.00D. The fitting cross can be located at 0, +2, or +4 mm above the 180 degree line (located on the geometrical center). The inset is variable from 0-15 degrees of gaze angle which comprises insets ranging from 0 to more than 5 mm.

Figure 6A:
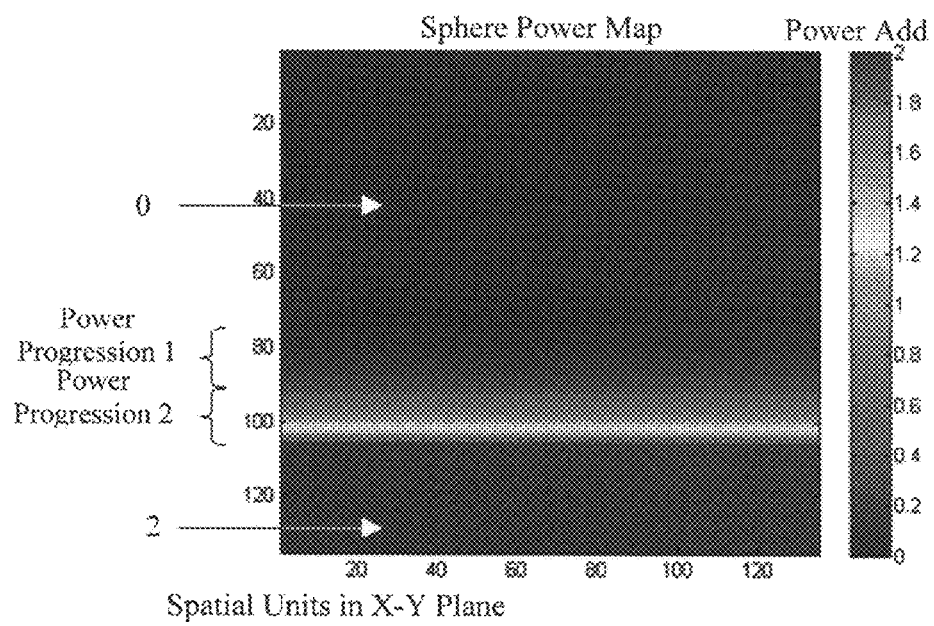
FIG. 6A illustrates an exemplary non-linear power progression that first increases slowly and then increases rapidly in power.

FIG. 6A illustrates an exemplary embodiment wherein a power progression that first increases slowly and then increases rapidly in power. The power progression from approximately 75 units to 90 units is approximately +0.5D. The power progression from approximately 90 units to 105 units is an incremental +1.5D.

Figure 6B:
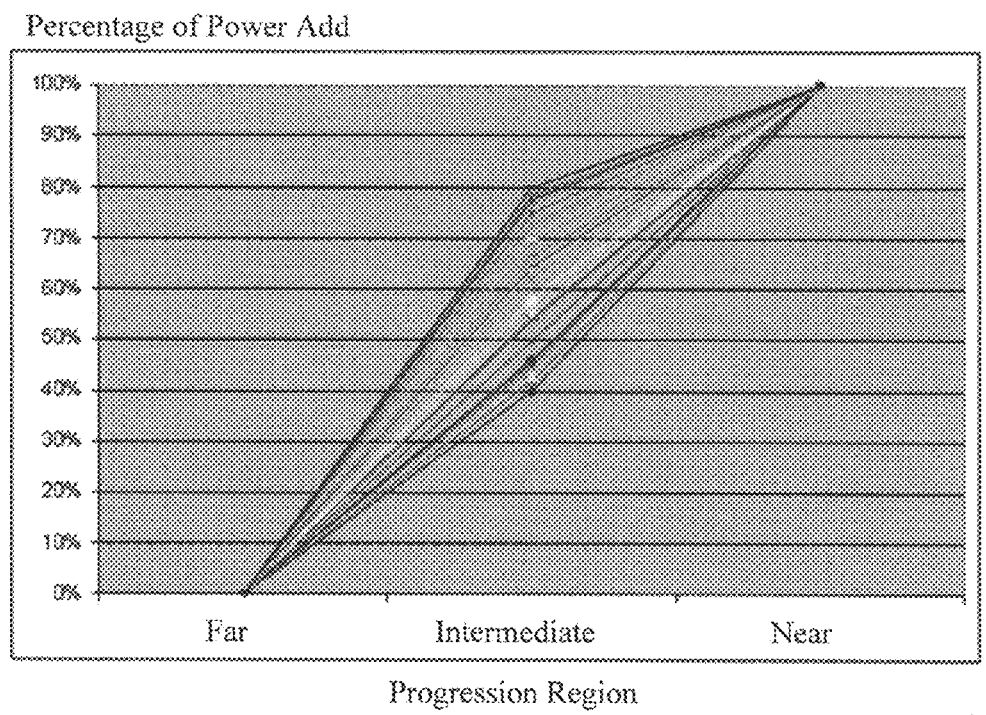
FIG. 6B illustrates an exemplary range of power progressions where the intermediate add varies as a percentage of near add in accordance with one embodiment of the invention.

FIG. 6B illustrates that the power progression in the sphere map may be distributed in a multitude of ways. For illustrative purposes, if the power progression rises sharply from the far to the intermediate zone, it will rise slowly from the intermediate to the near zone. Likewise, if the power progression rises slowly from the far to the intermediate zone, it will rise sharply from the intermediate to the near zone. Thus, as illustrated above, the intermediate zone may have a variable add power. In some embodiments, the non-linear power progression takes a form not disclosed in FIG. 6B. Additionally, in some exemplary embodiments, the distinct point(s) need not be at the geometrical mid-point of the power progression. In yet other embodiments, distinct point(s) between zones need not exist.

As an advantage to a variable intermediate power, the intermediate zone may be customized specific to the patient working distance (distance between the spectacle plane and the reading material (e.g. a computer LCD screen, etc.)) while wearing the customized PAL. Another advantage of the variable intermediate power is that the width of the intermediate zone can be widened further as compared to conventional PALs or PALs generated using a target sphere map with linear power progression.

The present PAL design surface can be added to the low order lens prescription surface to make the final PAL. Progressive design libraries (maps) with different add powers, corridor lengths, inset distances and other desired parameters can be made for convenience in manufacturing PALs. In other words, the progressive addition surfaces can be stored in a computer database comprising multiple progressive addition designs possessing far and near distances at different heights and near inset locations based on gaze angle. The progressive design map can then be added to the low order map to get the patient's prescription. The specific base curves employed and the particular low order values can be monitored to make sure that the perceived add power does not change for a particular progressive map. The design libraries can also have a variable inset (−5-15 and 0 degrees) for all add powers to ensure proper convergence in the near (reading) zone.

In another exemplary embodiment, PAL designs are tested with patients before manufacture. Many patients who have an add requirement over +2D complain that the near vision zone is too small. Unfortunately, neither the patient nor the doctor will know that the near vision zone is too small until the patient actually wears the lenses, that is, until after manufacture. In one embodiment, add powers at certain zones are simulated on a test lens before a patient's lenses are manufactured. In a further embodiment, a library of PALs is generated and added to a program for simulating images at different regions, such as Z-Vision (Ophthonix Inc. proprietary software capable of utilizing Zernike polynomials to simulate human vision and aberration using ETDRS chart) or Zemax. In some embodiments, a first time wearer of PALs is presented with a simulated image of an overall design that is optimized for a balance between far, intermediate, and near vision quality. Then, the quality is manually adjusted for the far, intermediate, or near vision zone images. In some embodiments, the patient can be shown how increasing the quality/size of the far vision zone can comprise the quality/size of the near and/or intermediate zones, and vise versa. This exemplary embodiment may also serve as an educational tool to help patients understand the inherent tradeoffs involved in PAL design. For example, a patient may learn that a PAL may not be able to provide undistorted vision through all points of the lens. Some patients may prefer to be able to read only a half page of text clearly at a time, but have an improved, crisp far vision zone for driving. On the other hand, some patients may be willing to sacrifice some far vision zone size to be able to clearly read a full page of text at a time. In some embodiments, the lenses can be made or simulated to meet the patient's preferences.

It is understood by one having ordinary skill in the art that PAL designs may involve tradeoffs, in addition to those described above. A short corridor can result in rapid power progression, high astigmatism, a narrow intermediate channel, and high magnification. A wide intermediate channel and low astigmatism can result in a slow power progression and larger fitting height. To achieve a short fitting height, the fitting cross may be moved down to an intermediate channel which may result in a low far vision rating by users. Large far and near zones can result in a high astigmatism, high magnification, and a narrow intermediate channel. The factors used in one embodiment to design a PAL result in an entire lens surface profile where sub-optimum areas cannot be changed without other areas being changed. In other words, one series of target maps and weight maps result in the creation of one lens surface.

In an exemplary embodiment, a method of designing PALs involves optimizing a two-dimensional optical path difference (OPD) so that the OPD approximates a target Zernike value at each point. Zernike values, which are well known in the art, are similar to slope and curvature and are used to describe an optical surface. Zernike values may be used to calculate both high order and low order aberrations in an algorithm. An exemplary algorithm for "PALgo" software is described in U.S. patent application Ser. No. 11/963,609 titled "CUSTOMIZED Z-LENS DESIGN PROGRAM," the content of which is hereby incorporated herein by reference in its entirety.

Another exemplary embodiment involves the creation of a progressive addition lens based upon wavefront refraction. The patient's vision prescription for the far zone is first measured by an optometrist, an optician, a trained technician, or by any other person or thing capable of using a wavefront based aberrometer. Afterwards, an intermediate and a near add is determined using either a wavefront based aberrometer, a phoropter, trial lenses, or by any other means that provides a specific patient prescription for an intermediate and near add.

In an exemplary embodiment, the intermediate power for a PAL design containing an intermediate and near prescription can be adjusted. In order to adjust the intermediate power, a patient's intermediate and near prescription at pre-determined distances are measured followed by a specific distance measurement between the spectacle lenses and a specific target (for example, a LCD screen.). The customized patient specific intermediate and near modified prescription can be provided by reference to a database (e.g. an intermediate power adjustment chart) that is provided to trained optical technicians, optometrists, or any other person. The same reference database can be created as a software application that runs on a desk top, laptop, cell phone, PDA, etc.

EXAMPLES

Using the wavefront optimization algorithm (PALgo) along with the target sphere, target cylinder, sphere weighting map and cylinder weighting map, several progressive addition surface maps and designs were created wherein the power progressions were non-linear. In all of the examples described below, horizontal and vertical magnification is controlled so that the weighting function limits the off-axis astigmatism to be less than −2.5D, more preferably less than −2D, for a progressive addition lens with a plano distance power and a power add of +2D. For PALs made for computer specific distance, the off-axis astigmatism can be less than −1.6D for a plano distance power and a power add of +2D. These designs are all based on creation of the wavefront optimized progressive addition surface (patient specific refraction). This means that the far power and add power are determined by an optometrist or a wavefront based refraction (as measured using a wavefront aberrometer that determines the low order aberrations based on high order aberration for far vision and/or near vision), frame selection, and personal use, which includes other features such as inclusion of tints, photochromic dyes, etc. and coating such as hard, AR, superhydrophobic, mirrors, etc. The patient specific refraction may also include wavefront based refraction for vision in the far zone, wavefront based refraction for vision in the near zone, optometrist based refraction for vision in the far zone, and optometrist based refraction for vision in the near zone, or any combination thereof. In all of the progressive designs created, there is an insignificant difference in the sphere and cylinder power maps for far zone power ranges from −10D to +8D and near or reading power ranges from +0.5D to +4.0D for the different corridor lengths that range from a minimum fitting height (i.e., measurement height corresponding to distance between fitting cross (location of center of pupil on the lens) to bottom of the frame) of 14 to 24 mm. This insignificant difference is due to the fact that the progressive lens designs are created for each add power and then combined with the low order prescription desired for each individual patient.

Example 1

FIGS. 7A-B illustrate exemplary target sphere maps for two customized progressive designs for plano lenses with +1.5D add powers at the center of the power progression and +2D add powers at the bottom of the power progressions. FIG. 7A is a representation of the target sphere power map where the far zone is represented from 0-90 units and has a plano power of 0D. The near zone is represented from 135-140 units and has a power of +2D. The non-linear sphere progression rises from 0D power at 90 units to +2D power at 135 units. The non-linear power progression rises steeply from 90 units to approximately 110 units and rises slowly from 110 units to 135 units. This flexibility allows for the creation of a progressive design where the progression can start significantly above or below the 180 degree line located at the geometrical center of the progressive design. In this way, lenses can be manufactured to minimize the perceptible change in power between zones that a wearer of spectacles may experience when there are three separate zones of power.

FIG. 7B is a representation of the target sphere power map wherein the progression region is located significantly above the 180 degree line. The far zone is represented from 0-20 units and has plano power 0D. The near zone is represented from 60-140 units and has a power of +2D. The non-linear sphere progression rises from 0D power at 20 units to +2D power at 60 units. The non-linear power progression rises steeply from 20 units to approximately 35 units and rises slowly from 35 units to 60 units.

Example 2

Figure 8A:
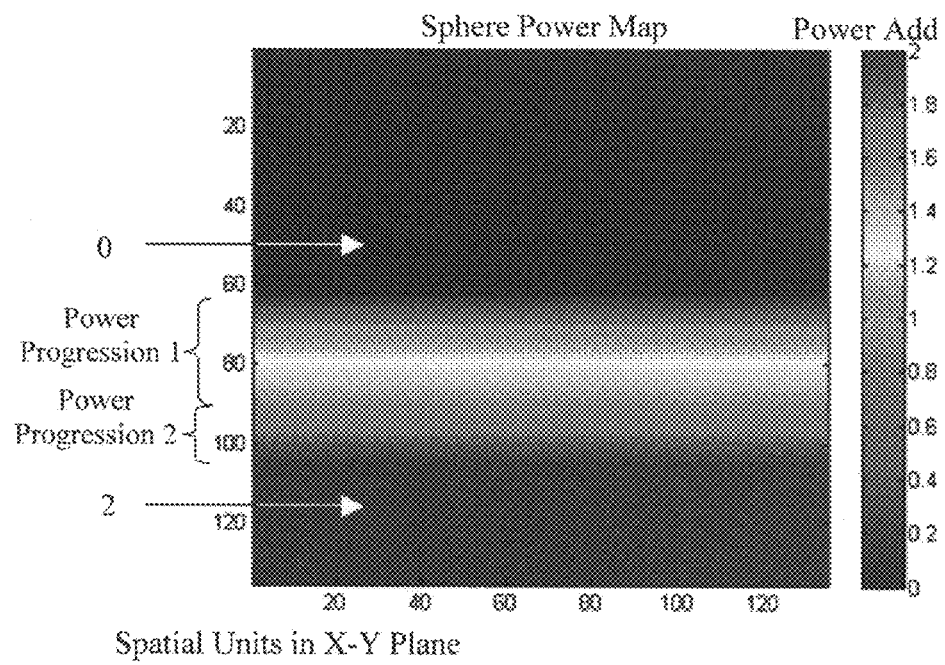
FIG. 8A illustrates an exemplary slope of a sphere non-linear power progression that rises sharply then rises slowly in accordance with one embodiment of the invention.

FIG. 8A illustrates an exemplary slope of a sphere non-linear power progression that rises sharply then rises slowly in accordance with one embodiment of the invention. The far zone possesses a plano power of 0D and is represented from 0-65 spatial units. The non-linear sphere progression rises sharply from 0D power at 65 units to +1.5D power at 90 units. This is followed by a slow power rise of +0.5D from 90 to 105 units. The near zone possesses a power of +2D and is represented from 105-140 spatial units. This flexibility allows for the creation of a progressive design where the intermediate power progression varies along the geometrical center.

Figure 8B:
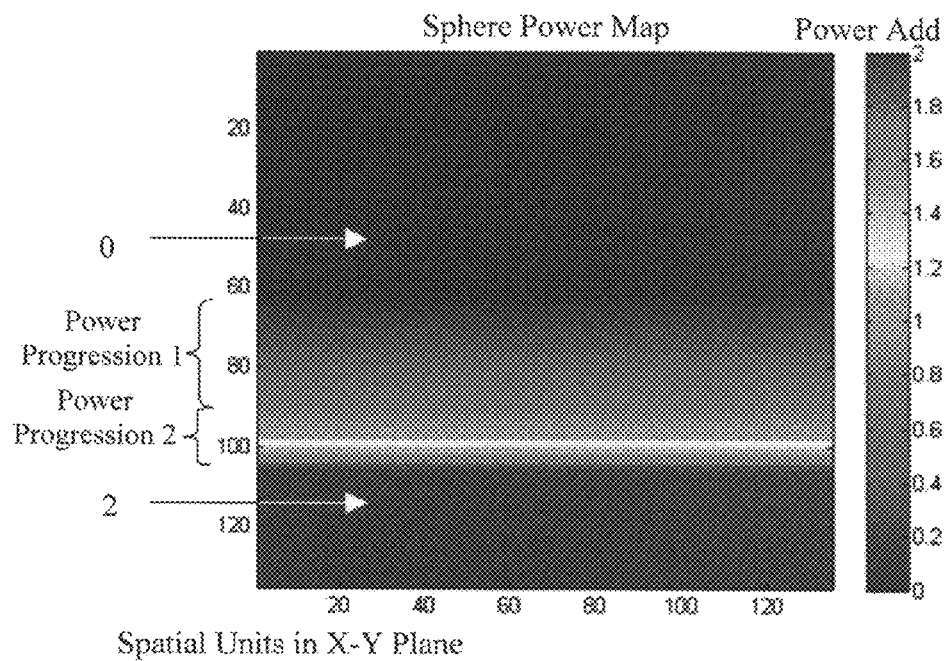
FIG. 8B illustrates an exemplary slope of the sphere non-linear power progression that rises slowly then rises sharply in accordance with one embodiment of the invention.

FIG. 8B illustrates an exemplary slope of a sphere non-linear power progression that rises slowly then rises sharply in accordance with one embodiment of the invention. The far zone possesses a plano power of 0D and is represented from 0-65 spatial units. The non-linear sphere progression rises slowly from 0D power at 65 units to +0.5D power at 90 units. This is followed by a sharp power rise of +0.5D from 90 to 105 units. The near zone possesses a power of +2D and is represented from 105-140 spatial units.

Example 3

FIG. 9 illustrates an exemplary Intermediate Power Adjustment Chart of an embodiment of the invention. The first column of the chart provides an initially measured intermediate power add at 24 inches and an initially measured near power add at 16 inches. These measurements are obtained by an optometrist, a trained optical technician using a phoropter, with trial lenses, or by any other technique known in the art where the reading chart is held at a specific distance from the spectacle plane to determine the intermediate and reading add power prescriptions. A chart can be constructed by inputting the intermediate and near powers measured at 16 and 24 inches and interpolating the powers in between the 16 and 24 inches and extrapolating to 30 or more inches as desired.

The second column of the chart provides a patient specific working distance between the spectacle lens plane and the reading material (e.g., computer screen, LCD screen, etc) and a corresponding recommended add power. The patient specific working distance can be determined by the patient or any other person with a tape measure, ruler, or any other measuring device. This distance information is provided to the optometrist or the optical technician who refers to a database (e.g. the Intermediate Power Adjustment Chart) to determine the customized patient specific intermediate and reading add power prescriptions at the measured distance. This is done by matching the measured add values in the first column with the distance measurement in the second column. Additionally, the intermediate power can be modified to a patient specific working distance via any number of means—such as a power adjustment chart, a database, or an algorithm that is installed on any electronic device.

For example, the chart can be used as follows: the doctor will determine the patient's intermediate add power at 24 inches and the reading add at 16 inches. This is the default power for the intermediate zone of the lens. If needed, the chart can be used to determine the new add power based on the actual distance the patient typically sits from a target (e.g., a computer monitor). This measurement can be provided by the patient using a tape measure that is provided to them during purchase or may be obtained by other methods known in the art. Using the new distance measurement, the new recommended add power can be determined by following the column down to the row that contained the 16 or 24 inch add power measurement that had been previously measured. For example, if the intermediate add at 24 inches was +1.00 and the patient's actual distance from their computer monitor was 28 inches, the new recommended add power could be +0.75. In the event that the recommended add power is "SV," the projected intermediate power could be very close to the near power. In the exemplary embodiment illustrated in FIG. 9, recommendation for an add power of "SV" is that the patient use a single-vision reading lens. If the recommended add power is "PAL/SV," the projected power is too far from the near power. In the exemplary embodiment illustrated in FIG. 9, the recommendation when the add power is "PAL/SV" is either a SV for intermediate use or a conventional PAL, depending on the intermediate power. The numbers and associated explanation provided for FIG. 9 are exemplary. It is understood that one of ordinary skill in the art could obtain add measurements at distances other than 16 and 24 inches. Additionally, it is understood that other values of a recommended add may be provided at actual computer distance. Additionally, it is understood that the actual computer distance is not limited to computer distance and may additionally include reading distance or any other distance known in the art.

All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application. Additionally, although a specific range of add powers (0, 2) has frequently been used in the exemplary embodiments of the invention, the spirit of the invention is not limited to this range. The invention contemplates a varying range of add powers that may be utilized.

We claim:

1. A method of designing a customized progressive addition lens (PAL) comprising:
generating a target sphere map that defines a non-linear power progression for a region of the PAL, wherein the PAL comprises a far, an intermediate and a near zone, and wherein said non-linear power progression comprises a first linear power progression comprising a portion of the far zone and an adjacent portion of the intermediate zone, and said non-linear power progression comprises a second linear power progression comprising a portion of the intermediate zone and an adjacent portion of the near zone, said first linear power progression being different than the second linear power progression, entireties of said first and second power progressions being linear;
generating a target cylinder map; and
combining the target sphere map and the target cylinder map to generate a prescription for the PAL,
wherein the prescription comprises distance power, intermediate power and near power.

2. The method of claim 1, further comprising:
generating a sphere weighting map;
generating a cylinder weighting map;
generating a target map of high order aberrations; and
generating a weighting map of high order aberrations,
wherein the target sphere map, the target cylinder map, the sphere weighting map, the cylinder weighting map, the target high order aberrations map, and the high order aberrations weighting map are combined to generate the prescription.

3. The method of claim 1, wherein the intermediate zone is patient specific and variable with regards to a near power.

4. The method of claim 1, wherein each of the far, intermediate, and near zones has one or more add powers.

5. The method of claim 4, further comprising assigning a plurality of progressive addition profiles at different locations of the lens based upon a plurality of gaze angles.

6. The method of claim 1, further comprising designing astigmatism contours in the top half of the lens without affecting a corridor or a width of the near zone.

7. The method of claim 1, further comprising controlling horizontal and vertical magnification so that an off-axis astigmatism correction of the lens is less than −2.5 D.

8. The method of claim 2, wherein highest weighting values of the sphere weighting map and the cylinder weighting map are assigned to geometrical centers of the sphere and cylinder weighting maps.

9. The method of claim 1, wherein a center of the power progression is not a center of the target sphere map.

10. The method of claim 1, wherein the power progression varies along both sides of a geometrical center, wherein the power progression is located in the intermediate zone.

11. The method of claim 1, wherein the power progression is customized to a patient working distance and to a patient refraction.

12. The method of claim 11, wherein the patient refraction is determined at the actual working distance for an intermediate power.

13. The method of claim 11, wherein the patient refraction is determined at a standard distance for an intermediate power add, wherein the intermediate power add is modified to the patient specific working distance via a power adjustment database.

14. The method of claim 11, wherein the patient refraction, the working distance, and a wavefront fitting optimization are used to calculate a progressive addition lens profile that is applied to one or more surfaces of the PAL.

15. A method of designing a customized progressive addition lens (PAL) comprising:
generating a target sphere map that defines a non-linear power progression for a region of the PAL, wherein the PAL comprises a far, an intermediate and a near zone, and wherein said non-linear power progression comprises a first linear power progression comprising a portion of the far zone and an adjacent portion of the intermediate zone, and said non-linear power progression comprises a second linear power progression from comprising a portion of the intermediate zone and an adjacent portion of the near zone, said first linear power progression being different than the second linear power progression, wherein an entirety of one of the first and second power progressions is linear and another of the first and second power progressions is non-linear;
generating a target cylinder map; and
combining the target sphere map and the target cylinder map to generate a prescription for the PAL,
wherein the prescription comprises distance power, intermediate power and near power.

* * * * *